(12) United States Patent
Pitzer

(10) Patent No.: US 6,227,055 B1
(45) Date of Patent: May 8, 2001

(54) PRESSURE SENSOR ASSEMBLY WITH DIRECT BACKSIDE SENSING

(75) Inventor: Paul Joseph Pitzer, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/432,377

(22) Filed: Nov. 1, 1999

(51) Int. Cl.[7] .................................................. G01L 7/08
(52) U.S. Cl. ............................................................. 73/715
(58) Field of Search ................................. 73/715, 716, 718, 73/719, 720–28, 756, 754, 706; 361/283; 338/4

(56) References Cited

U.S. PATENT DOCUMENTS

| | | | | |
|---|---|---|---|---|
| 5,257,547 | * | 11/1993 | Boyer ....................................... | 73/756 |
| 5,648,615 | * | 7/1997 | Jeske et al. ............................. | 73/756 |
| 5,706,372 | * | 1/1998 | Viduya ..................................... | 385/12 |
| 5,939,637 | * | 8/1999 | Pitzer et al. ............................ | 73/715 |

* cited by examiner

Primary Examiner—William Oen

(74) Attorney, Agent, or Firm—Jimmy L. Funke

(57) ABSTRACT

An improved, low-cost, back-side sensing pressure sensor assembly having a high integrity seal between the sensor element and the pressure port. The pressure port has a stud portion at an inboard end for attachment to a pressure vessel wall, and a cup portion at an outboard end for housing the sensor and interface circuitry. A central well extends inward from an inboard face of the cup portion, and a central axial bore in the stud portion opens into the well. A planar carrier disc carrying the sensor element closes the outboard end of the well. The sensor element comprises a silicon diaphragm formed on the outboard end of a glass pedestal that passes through a complementary opening formed in the carrier disc, and the inboard end of the pedestal includes an integral radially extending rim or shoulder that seats on the inboard face of the carrier disc about the opening. A suitable adhesive is used to bond the pedestal rim to the disc, and in operation, the fluid pressure in the vessel places the adhesive joint in compression to provide a long term, high integrity, seal between the well and the remainder of the cup portion. In a first embodiment, the interface circuitry and conductor traces and pads that interconnect the sensor terminals are formed on the outboard face of the carrier disc, whereas in a second embodiment, the circuitry and conductor traces and pads are formed on a flexible circuit glued to the outboard face of the carrier disc.

9 Claims, 3 Drawing Sheets

PRESSURE SENSOR ASSEMBLY WITH DIRECT BACKSIDE SENSING

TECHNICAL FIELD

This invention relates to apparatus for detecting the pressure of a fluid, and more particularly to a sensor assembly in which the pressure to be sensed is directly applied to the back-side of a pressure sensor element.

BACKGROUND OF THE INVENTION

In automotive control applications, it is frequently desired to measure the pressure of certain fluids, such as engine crankcase oil, brake fluid, engine fuel, etc. In general, the best results have been achieved with so-called "backside-sensing" designs in which the fluid to be sensed enters a sealed cavity terminated by the back (inboard) face of the sensor element. The remainder of the cavity is defined by the interior walls of a pressure port which attaches to a wall of the fluid container by a threaded fitting, or the like. The electrical terminals of the sensor element are formed on its front (outboard) face, and may be conveniently coupled to suitable interface circuitry by wire-bonding, for example. In high pressure applications, the sensor element and port are typically formed of stainless steel, and the sensor is welded to the pressure port, forming a hermetic and leak-proof seal between the fluid and the sensor housing. In lower pressure applications, a lower cost silicon sensor may be used; in this case the pressure port may also be formed with a lower cost material, and the sensor can be bonded to the pressure port with a suitable adhesive, which also seals the fluid from the sensor housing.

Clearly, the silicon approach enables significant cost savings compared to the stainless steel approach due to lower cost materials and processing. However, there is some concern about the long term integrity of the seal provided by the adhesive joint between the sensor and pressure port, since the sensed fluid pressure applies tension to the joint. Accordingly, what is needed is a low cost back-side sensor assembly having a durable and high integrity seal between the sensor and pressure port.

SUMMARY OF THE INVENTION

The present invention is directed to an improved, low-cost, back-side sensing pressure sensor assembly having a high integrity seal between the sensor element and the pressure port. The pressure port has a stud portion at an inboard end for attachment to a pressure vessel wall, and a cup portion at an outboard end for housing the sensor and interface circuitry. A central well extends inward from an inboard face of the cup portion, and a central axial bore in the stud portion opens into the well. A planar carrier disc carrying the sensor element closes the outboard end of the well. The sensor element comprises a silicon diaphragm formed on the outboard end of a glass pedestal that passes through a complementary opening formed in the carrier disc, and the inboard end of the pedestal includes an integral radially extending rim or shoulder that seats on the inboard face of the carrier disc about the opening. A suitable adhesive is used to bond the pedestal rim to the disc, and in operation, the fluid pressure in the vessel places the adhesive joint in compression to provide a long term, high integrity, seal between the well and the remainder of the cup portion. In a first embodiment, the interface circuitry and conductor traces and pads that interconnect the sensor terminals are formed on the outboard face of the carrier disc, whereas in a second embodiment, the circuitry and conductor traces and pads are formed on a flexible circuit glued to the outboard face of the carrier disc.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
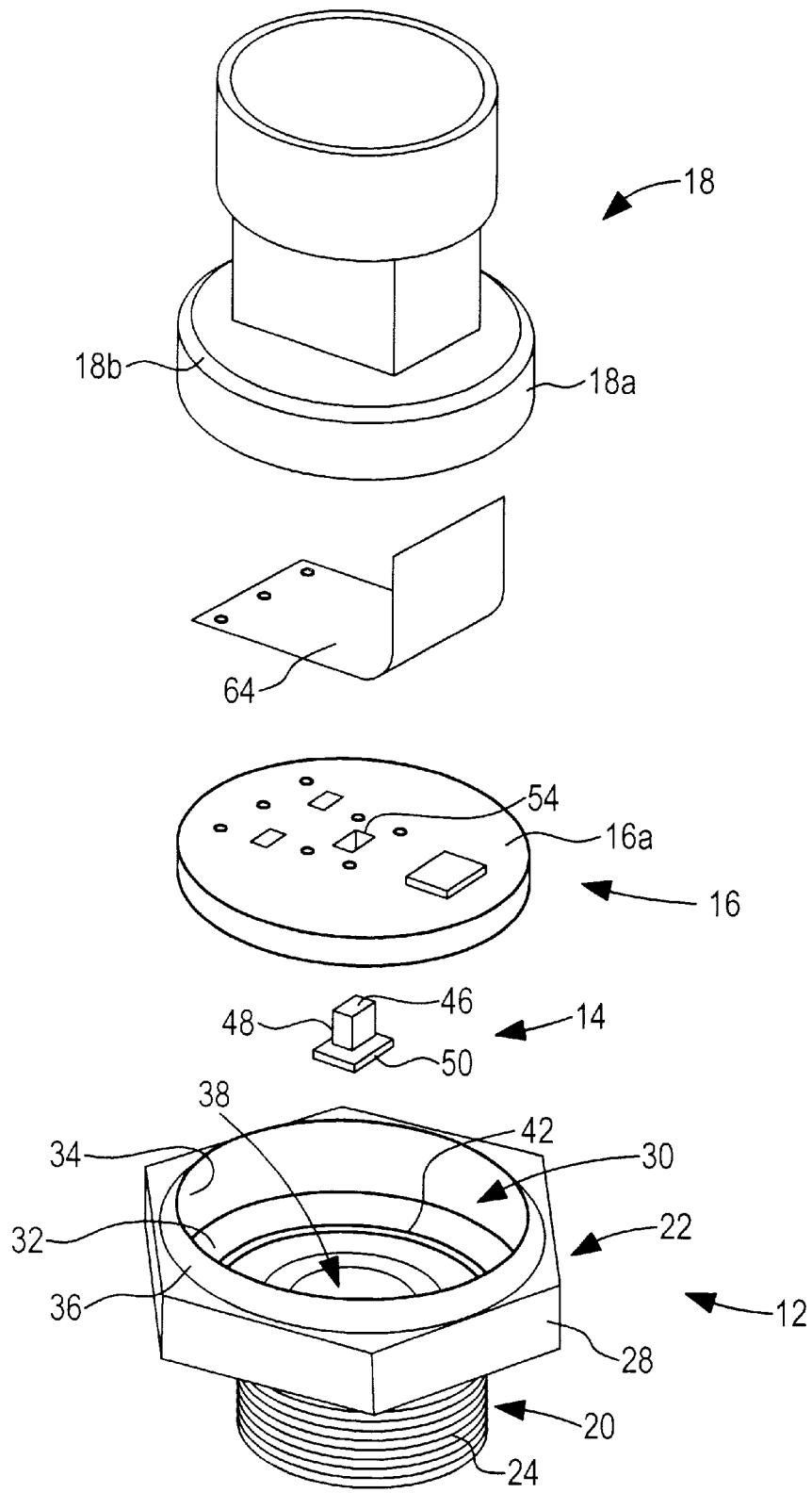
FIG. 1 is an exploded view of a pressure sensor assembly according to a first embodiment of this invention, including a ceramic carrier disc and a silicon-on-glass sensor having an integral radially extending glass rim.
Figure 2:
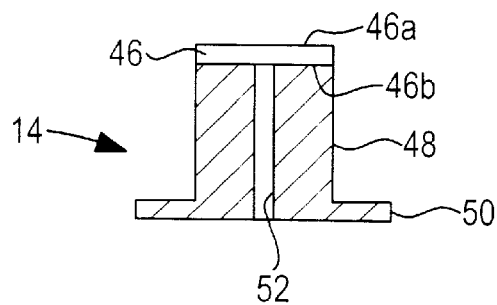
FIG. 2 is a cross-sectional view of the silicon-on-glass sensor of FIG. 1.
Figure 3:
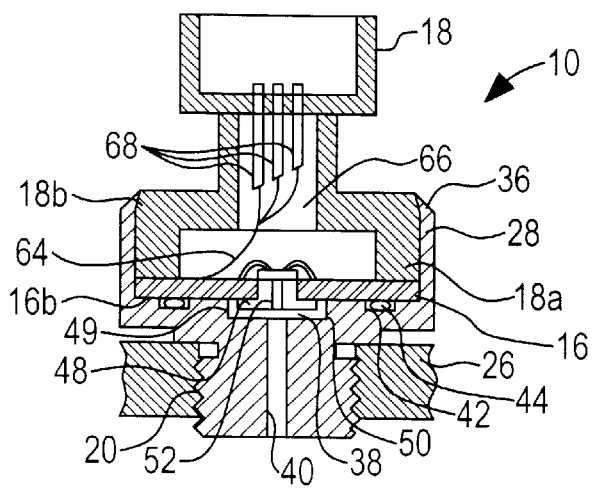
FIG. 3 is a cross-sectional view of the pressure sensor assembly of FIG. 1.

Referring to the drawings, and particularly to FIGS. 1–3, the reference numeral 10 generally designates a sensor assembly for sensing the pressure of a fluid contained within a pressure vessel. The sensor assembly 10 comprises a pressure port 12, a silicon-on-glass pedestal pressure sensor 14, a planar carrier disc 16, and a connector housing 18.

The pressure port 12 is formed of an inexpensive metal such as cold rolled steel; it has a stud portion 20 at one (inboard) axial end and a cup portion 22 at the other (outboard) axial end. The stud portion 20 is provided with external threads 24 for attachment of the assembly 10 to the wall 26 of a pressure vessel. For example, the wall 26 may a sidewall of an engine crankcase, fuel injection rail, etc. The cup portion 22 has a hex-shaped periphery 28 adapted to be engaged by a tool during installation and/or removal of the assembly 10, and defines an internal cylindrical cavity 30 having an inboard face 32 and sidewall 34 with an integral circular lip 36 at the outboard periphery thereof. A central cylindrical well 38 extends axially inward from the inboard face 32, and a central axial bore 40 opens into the well 38 and extends though the stud portion 20, allowing pressurized fluid to enter well 38. An annular slot 42 encircling the well 38 accommodates an O-ring 44.

The pressure sensor 14, more clearly depicted in FIG. 2, comprises a silicon diaphragm 46 and a glass pedestal 48. The diaphragm 46 has a front-side 46a that supports the sensor bridge elements (not shown), and a back-side 46b that is electrostatically bonded to one end of the pedestal 48. The other end of pedestal 48 has an integral depending rim 50 that extends laterally outward. Although the pedestal 48 and depending rim 50 are depicted as being rectangular in a lateral plane, they could be alternatively have a different shape such as circular, trapezoidal, etc. A central axial bore 52 extends through the entire axial length of pedestal 48, subjecting the back-side 46b of diaphragm 46 to pressure variations present in the bore 52.

The cylindrical carrier disc 16 has an outboard face 16a, an inboard face 16b, and a diameter that generally matches that of cavity 30, as best seen in the cross-sectional view of FIG. 3. The disc 16 has a central opening 54 that accommodates the diaphragm 46 and pedestal 48, with the depending rim 50 seating against the inboard face 16b. A suitable adhesive 49 between the rim 50 and inboard face 16b bonds the sensor 14 to the disc 16. The inboard face 16b is placed in contact with the inboard face 32 of pressure port cavity 30, positioning the inboard end of sensor 14 in the well 38, with the bores 40 and 52 in axial alignment.

Figure 4:
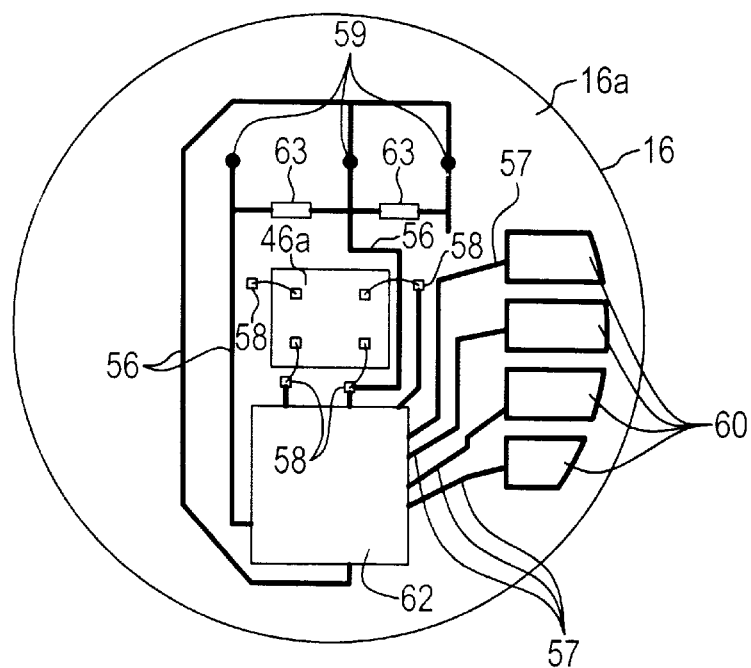
FIG. 4 is a detailed view of the carrier disc of FIG. 1.

As best seen in FIG. 4, the outboard face 16a of carrier disc 16 is imprinted with a number of conductive traces 56, 57 and pads 58, 59, 60 which together with various electronic components 62, 63, define a circuit for interfacing the pressure sensor 14 with an external circuit (not shown). Alternatively, the carrier disc 16 may be formed of stainless steel or another suitable material, and the conductive traces may be formed on the outboard face 16a using conventional thick-film processing techniques. In any event, terminals formed on the outboard face 46a of diaphragm 46 are wire bonded to the pads 58, and the traces 56 interconnect the pads 58 with components 62, 63; the pads 59 are output terminals for the circuit. The component 62 may be a compensator IC, and the components 63 may be capacitors. The traces 57 couple the compensator IC 62 to a set of probe pads 60, which are used during a calibration procedure involving trimming of the pressure sensor 14. A flexible circuit 64 contacts the pads 59, and extends up into a central opening 66 of connector housing 18 as shown in FIG. 3 to facilitate connection of the pads 59 to terminal blades 68 supported within the housing 18.

The connector housing 18 is formed of plastic material, and has an annular base portion 18a that generally conforms to the cavity sidewall 34. The base portion 18a is disposed within the cavity 30, and rests on marginal portions of the carrier disc 16, as best shown in FIG. 3. The housing 18 is retained within cavity 30 by the circular lip 36, which is crimped radially inward, engaging an angled housing surface 18b depending from base portion 18a. The crimping action also serves to press the base portion 18a against the carrier disk 16, compressing the O-ring 44 within the slot 42.

The sensor assembly steps, best illustrated in FIG. 1, include: gluing the pressure sensor rim 50 to the inboard face 16b of carrier disc 16, placing the components 62, 63 on the outboard face 16a, wire-bonding the diaphragm terminal pads to the conductive pads 58, mounting the carrier assembly 14/16 in the cavity 30, calibrating the pressure sensor 14, attaching the flex circuit 64 to the conductive pads 59 and to the terminal blades 68, mounting the connector housing 18 on the carrier disc 16, and crimping the circular lip 36.

Figure 5:
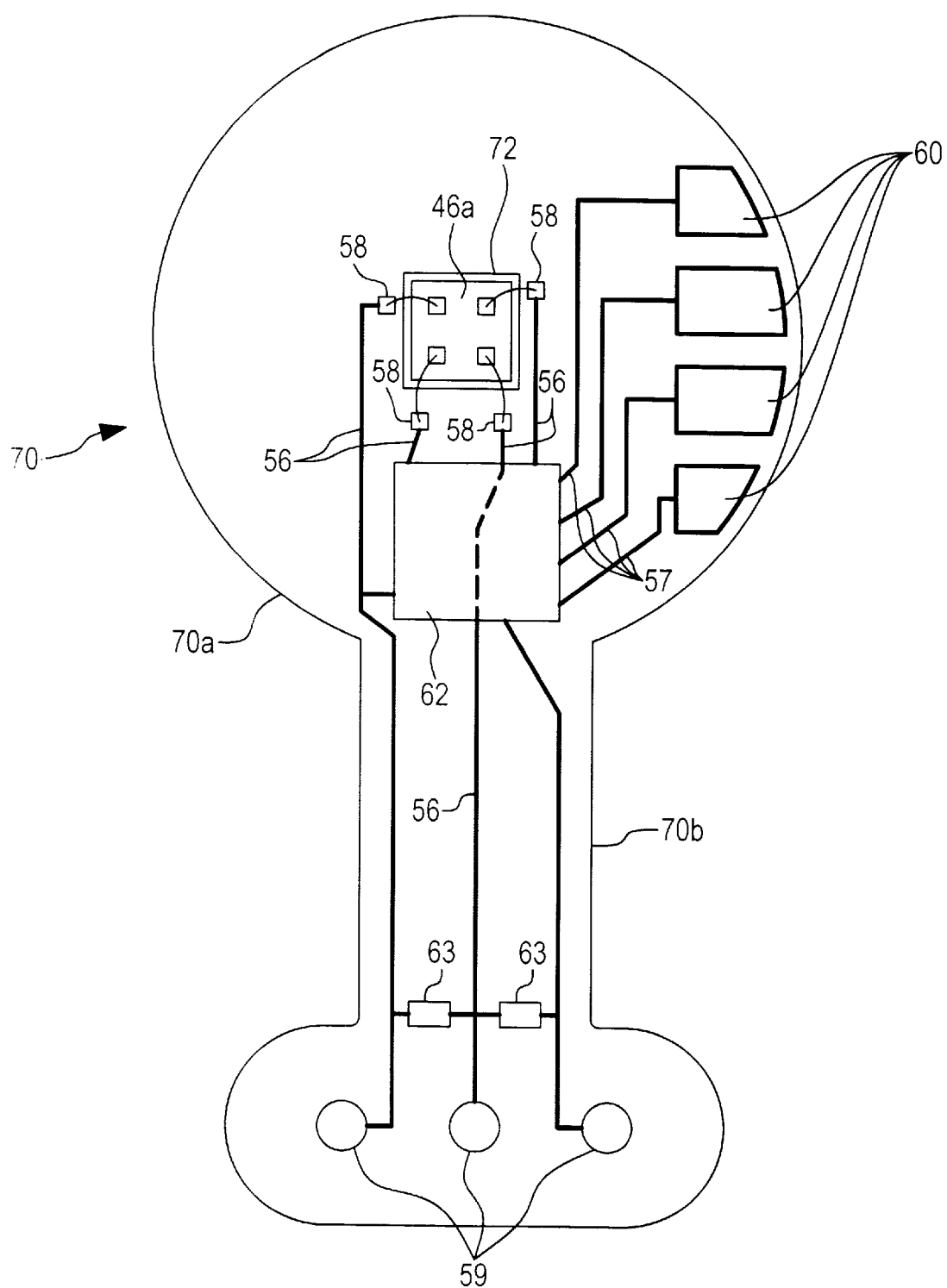
FIG. 5 is a flexible circuit adapted to be mounted on plastic or metal carrier disc according to a second embodiment of this invention.

FIG. 5 depicts a second embodiment in which the various circuit traces, pads and components are mounted on a flexible circuit 70 instead of the outboard face 16a of carrier disc 16. The flexible circuit has a central portion 70a with an opening 72 sized to accommodate the sensor diaphragm 46 and a depending strip 70b having output terminals 59. The central portion 70a fits within the inside diameter of the connector housing base portion 18a, and is glued to the outboard face 16a, with the depending strip 70b extending up into the central opening 66 of connector housing 18, in the manner of the flexible circuit 64 of the first embodiment. The capacitors 63 may be mounted on the depending strip 70b as shown, or on the central portion 70a. Since the interface circuitry is not formed on the carrier disc itself, the carrier disc 16 may be formed of plastic or a suitable metal, if desired, and the assembly steps may be somewhat simplified.

In summary, the present invention provides an improved, low-cost, pressure sensor in which an adhesive joint between the pressure sensor and a carrier disc is placed in compression by the fluid to be sensed, thereby maintaining a high integrity seal between the sensor element and the pressure port. While the invention has been described in reference to the illustrated embodiment, it will be understood that various modifications in addition to those mentioned above will occur to those skilled in the art, and that sensor assemblies incorporating such modifications may fall within the scope of this invention, which is defined by the appended claims.

What is claimed is:

1. A pressure sensor assembly comprising:

a pressure port having a stud portion at an inboard axial end for attachment to a pressure vessel containing a pressurized fluid, and a cup portion at an outboard axial end for defining an internal cavity, a well formed in an inboard face of said internal cavity, and a first axial bore opening into said well and extending completely through said stud portion;

a carrier disc secured within said internal cavity on an inboard face of said internal cavity;

a sensor diaphragm on a pedestal having a second axial bore and a laterally enlarged base portion, the pedestal extending through an opening in said carrier disc so that said first and second bores are axially aligned and said base portion seats against an inboard face of said carrier disc; and an adhesive joint between the base portion of said pedestal and the inboard face of said carrier disc, forming a seal between said well and said cavity, said pressurized fluid placing said adhesive joint in compression to enhance and maintain said seal.

2. The pressure sensor assembly of claim 1, further comprising:

an annular slot formed in the inboard face of said internal cavity;

an O-ring disposed in said annular slot;

a housing member having an annular base portion disposed on a marginal portion of said carrier disc; and a deformable lip on the cup portion of said pressure port for pressing the base portion of said housing member against said carrier disc to secure said carrier disc within said internal cavity and compress said O-ring between said carrier disc and said annular slot, forming a seal between said carrier disc and the inboard face of said internal cavity.

3. The pressure sensor assembly of claim 1, including a silicon sensor diaphragm on a glass pedestal.

4. A pressure sensor assembly of claim 1, further comprising:

an interface circuit formed on an outboard face of said carrier disc;

a connector housing attached to said pressure port;

first electrical connections between said interface circuit and sensor terminals formed on an outboard face of said sensor diaphragm; and second electrical connections between said interface circuit and terminals disposed in said connector housing.

5. The pressure sensor assembly of claim 4, wherein the first electrical connections are wire-bonds.

6. The pressure sensor assembly of claim 4, wherein the second electrical connections are defined by a flexible circuit extending between the interface circuit and the connector housing terminals.

7. The pressure sensor assembly of claim 1, further comprising:
- a connector housing having connector terminals and being attached to said pressure port;
- a flexible circuit having a first portion disposed on an outboard face of said carrier disk for supporting an interface circuit, and a second portion extending from said first portion into said connector housing to define an electrical connection between said interface circuit and said connector terminals.

8. The pressure sensor assembly of claim 7, wherein said housing has an annular base portion disposed on a marginal portion of said carrier disc, and said flexible circuit is disposed within an inside diameter of said base portion.

9. The pressure sensor assembly of claim 7, wherein the central portion of said flexible circuit includes an opening to accommodate said sensor diaphragm, and terminals on an outboard face of said sensor diaphragm are wire bonded to said interface circuit.

* * * * *